United States Patent [19]

Riley

[11] Patent Number: 4,799,936

[45] Date of Patent: Jan. 24, 1989

[54] PROCESS OF FORMING CONDUCTIVE OXIDE LAYERS IN SOLID OXIDE FUEL CELLS

[75] Inventor: Brian Riley, Willimantic, Conn.

[73] Assignee: Combustion Engineering, Inc., Windsor, Conn.

[21] Appl. No.: 63,883

[22] Filed: Jun. 19, 1987

[51] Int. Cl.[4] .............................................. H01M 8/12
[52] U.S. Cl. ...................................... 29/623.1; 429/30
[58] Field of Search ........................... 429/30; 29/623.1

[56] References Cited

U.S. PATENT DOCUMENTS 4,568,442 2/1986 Goldsmith ............................ 429/42

Primary Examiner—Donald L. Walton
Attorney, Agent, or Firm—Richard H. Berneike

[57] ABSTRACT

A solid oxide fuel cell is formed in the green state with a binder and then a combination of microwave and conventional heating is employed to first remove the binder at a lower temperature and then sinter the oxides at a higher temperature to form the fuel cell. This heating technique not only reduces the time and power requirement but also eliminates large temperature gradients within the oxide material and reduces the attendant problems of internal cracking, separation of components, blistering and delamination.

2 Claims, 3 Drawing Sheets

PROCESS OF FORMING CONDUCTIVE OXIDE LAYERS IN SOLID OXIDE FUEL CELLS

BACKGROUND OF THE INVENTION

The present invention relates to a method of forming conductive oxide layers and more particularly the method of forming the anode, cathode, and electrolyte layers in a tubular, planar, or monolithic type solid oxide fuel cell.

One method for the conversion of chemical energy directly to electrical energy is by the use of fuel cells. The three main types of fuel cells now being developed for industrial application in the hundred of megawatts range are phosphoric acid fuel cells, molten carbonate fuel cells, and solid oxide fuel cells. All three types are essentially chemical cells having an anode where the fuel is absorbed, a cathode where oxidants are absorbed and an electrolyte where fuel and oxidant are reacted.

In the solid oxide fuel cell, the electrolyte is normally composed of a thin layer yttria stabilized zirconia, the anode or fuel electrode is a cermet of nickel and zirconia and the cathode or air electrode is a strontium doped lanthanum manganite. The interconnectors are normally magnesium doped lanthanum chromite.

There are three main types of solid oxide fuel cells: the tubular design, the planar design, and the monolithic design. The present invention which relates to the method of forming these composite structures of thin sheets of conductive oxides may be applied to any type of solid oxide fuel cell but will be described with particular references to the monolithic solid oxide fuel cells.

The material integrity of the monolithic solid oxide fuel cell and the intrinsic electronic structure of the triplex layer (anode, cathode, and electrolyte), and the interconnector dominate the working efficiency of the module. Internal cracking, delamination, and bubbles have been the cause of a large number of failures in the internal fabrications of these monolithic oxide stacks. Analyses have shown that the possible cause of failure may be due to the manufacturing process for the removal of binder and sintering of the oxides, due to inherent uneven heating and differential thermal expansion during temperature cycling. One of the greatest inherent problems in the processing of the ceramics is the removal of the binder by decomposition and removal of the gas phase at relatively low temperatures and the lack of a uniform temperature throughout the entire ceramic system. Any temperature differential within the same material and/or different rates of decomposition between dissimilar materials will cause stress related areas within the system these stress areas will be the cause of separation of contact points and/or separation at the interfaces of surfaces during the fabrication process or during operation of the cell.

The present method of heating composite structures of the type used for solid oxide fuel cells is by radiation heating in resistance-type furnaces or in hot gas convection furnaces. With radiation heating, the internal region of the thin layer monolith is heated by thermal conductions. The very design of the structure is an efficient thermal insulation, which means that radiation heat impinging on the outer surface of the structure, will take a considerable time before the internal of the cell reaches the same temperature. Large temperature gradients are, therefore inevitable. During the removal of binder with temperatures on the order of 400° C., the temperature differential within the structure will be proportionally greater than the temperature differential at the sintering temperatures of 1400° C. to 1600° C. During the removal of binder, the variations in temperature and, therefore, the variations in the rate and extent of decomposition of the binders will result in distortion, delamination, and cracking.

SUMMARY OF THE INVENTION

The present invention relates to a method of forming the oxide layers of a solid oxide fuel cell and more particularly to the method forming the anode, cathode, and electrolyte layers in a manner which will eliminate the large temperature gradients within the oxide materials. The invention relates to the use of microwave heating or a combination of microwave and convection heating.

DESCRIPTION OF THE PREFERRED EMBODIMENTS

Figure 1:
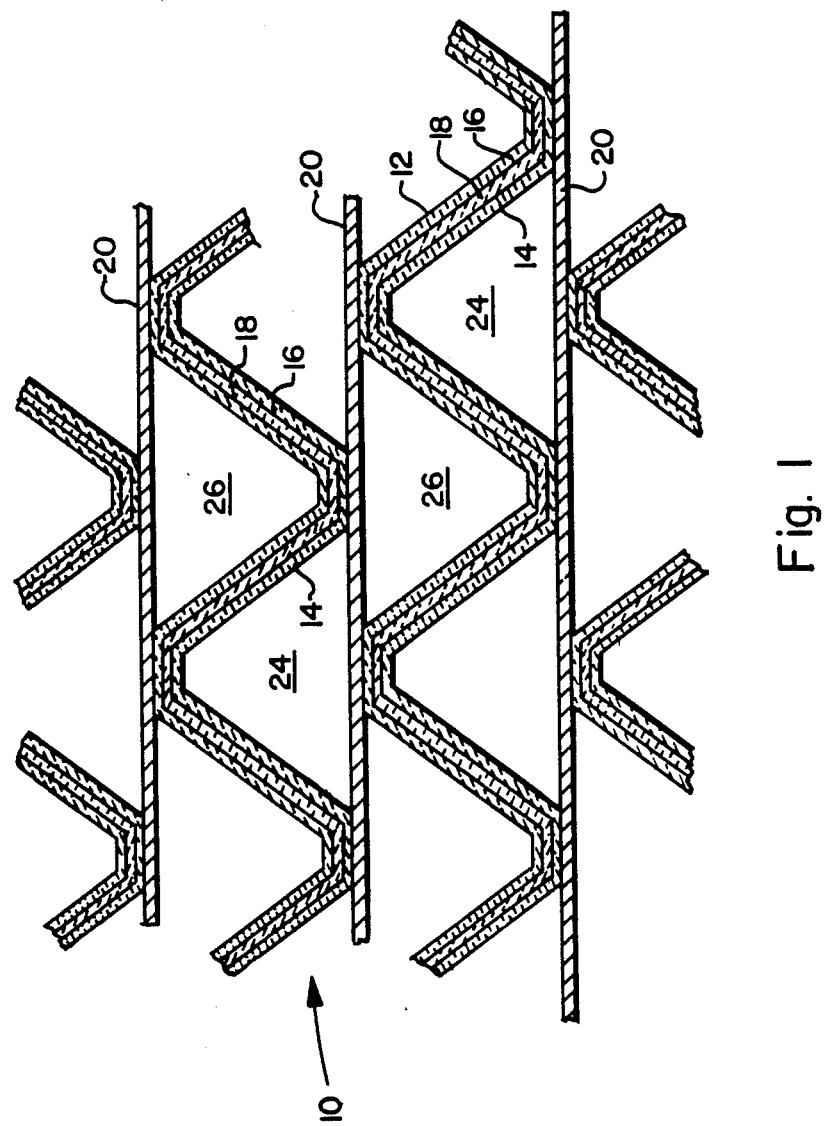
FIG. 1 is a cross-section of a monolithic solid oxide fuel cell.

FIG. 1 illustrates a cross-section of a portion of a typical monolithic solid oxide fuel cell module 10. The fuel cell comprises the triplex layers 12, which are composed of the fuel electrode or anode 14, the air electrode or cathode 16 and the electrolyte 18. Each triplex layer 12 is formed into the corrugated pattern, as illustrated, and sandwiched between two interconnector layers 20. The fuel then flows through the channels 24, which are thereby formed in the module and adjacent to the fuel electrode or anode while the air flows through the channels 26 adjacent to the air electrode or cathode 12. The fuel and oxidant is physically separated by the impervious interconnector and electrolyte. The fuel and air electrodes are porous enough to allow both fuel and air to reach the electrolyte by diffusion. This construction of a monolithic solid oxide fuel cell is well known in the art, as is the operation of such a fuel cell.

For illustration purposes only, typical compositions of the components of a monolithic solid oxide fuel cell are as follows:

| | |
|---|---|
| Cathode | $Sr_{0.1} La_{0.9} Mn_{1.0} O_3$ |
| Anode | $NiO\ ZrO_2$ |
| Electrolyte | $Y_{0.1} Zr_{0.9} O_2$ |
| Interconnector | $Mg_{0.04} La_{1.0} Cr_{0.92} O_3$ |

For similar illustration purposes only, a typical monolithic solid oxide fuel cell powder blend composition is as follows:

| | |
|---|---|
| Oxide powder | 70–80 Wt. % |
| Resin-acrylic or thermosetting resin | 15–18 Wt. % |
| Plasticizer/Solvent-xylene/butanol mix | 2–4 Wt. % |
| Dispersant-fish oil | 1–2 Wt. % |
| Typical weight loss after debinding | 20–30 Wt. % |
| Typical shrinkage after sintering | 20–25% linear |
| | 40–50 Vol. % |

The powder blends for fuel cells are notoriously esoteric in nature and will be selected to suit the particular fuel cell concept and design. However, the powder to organics ratio is usually about 70:30 Wt. % or about 40:60 Vol. %.

The individual layers of the solid oxide fuel cell of the present are formed by mixing the appropriate powders for that layer with organic binders (resins, plasticizers and dispersants) in any appropriate type of blender. This will form a plastic composite material, which is capable of being hot rolled into thin sheets. These sheets have a high solids loading, for example, about 40 percent solids, and a high density, for example, less that one 1 volume percent porosity.

Figure 2:
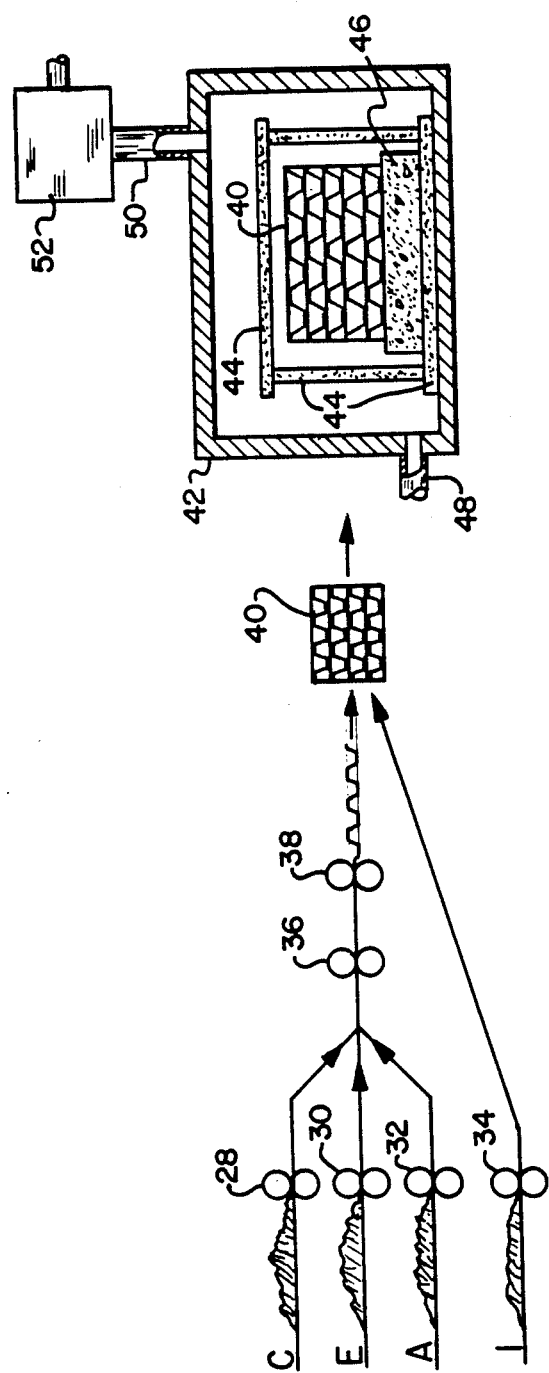
FIG. 2 schematically illustrates one method of manufacturing monolithic sold oxide fuel cells, including the present invention.

Another technique is to mix the powders with enough added solvent to form a slip or thick slurry. This slurry can then be cast or spread into thin sheets and, after solvent evaporation and/or plastic polymer curing, the pliable film may be stripped from the underline casting surface for further processing. Of course, each layer is formed from the appropriate powder materials such as the cathode, anode, electrolyte, and interconnector materials previously given by way of example. The hot rolling of the plastic materials into thin sheets is illustrated in FIG. 2, with the cathode being hot rolled at 28, the electrolyte being hot rolled at 30, the anode being hot rolled at 32, and the interconnectors being hot rolled at 34. The cathode, electrolyte, and anode layers are then sandwiched together between the rolls 36 and corrugated at 38 to form the triplex layer 12, as shown in FIG. 1. The triplex layer and the interconnector layers are the assembled at 40 to form a stacked assembly with as may layers as desired. At this point, the materials in each layer of the assembly are still in the green and unsintered state. Also, the procedure, up to this point, is essentially as practiced in the prior art.

The green monolithic solid oxide fuel cell module is now loaded into a microwave furnace 42 and preferably surrounded by refractory insulation 44. The module may be placed on a suitable non-coupling fiber insulation block 46. The furnace enclosure is provided with inlet duct 48 and outlet duct 50 for supplying a furance atmosphere of controlled temperature. The outlet duct 50 is provided with a suitable gas processing system 52 for handling and treating the effluent gases containing the binder. The power is then activated to the microwave furnace and is adjusted to gradually increase the temperature at a typical rate of about 2° C. to 3° C. per minute up to the temperature for the removal of the binder which would typically be about 400° C. to 600° C. This temperature rise can be seen at 54 in FIG. 3 which is an example of the temperature profile of the process.

Organic binders are usually removed by two processes. One is volatilization where the organic is distilled off in its original form, i.e. xylene, n-butanol, water, etc. The other is cracking, where the organic molecule splits under the influence of heat to form volatile gases or vapors and a residue of a carbonaceous material (coke). With an increase in temperature (600° C. above) in an oxidizing atmosphere, this carbonaceous material further oxidizes to give CO or $CO_2$. If there are reducing conditions, care should be taken that residual carbon is not formed into carbides or oxycarbides within the ceramic materials.

Figure 3:
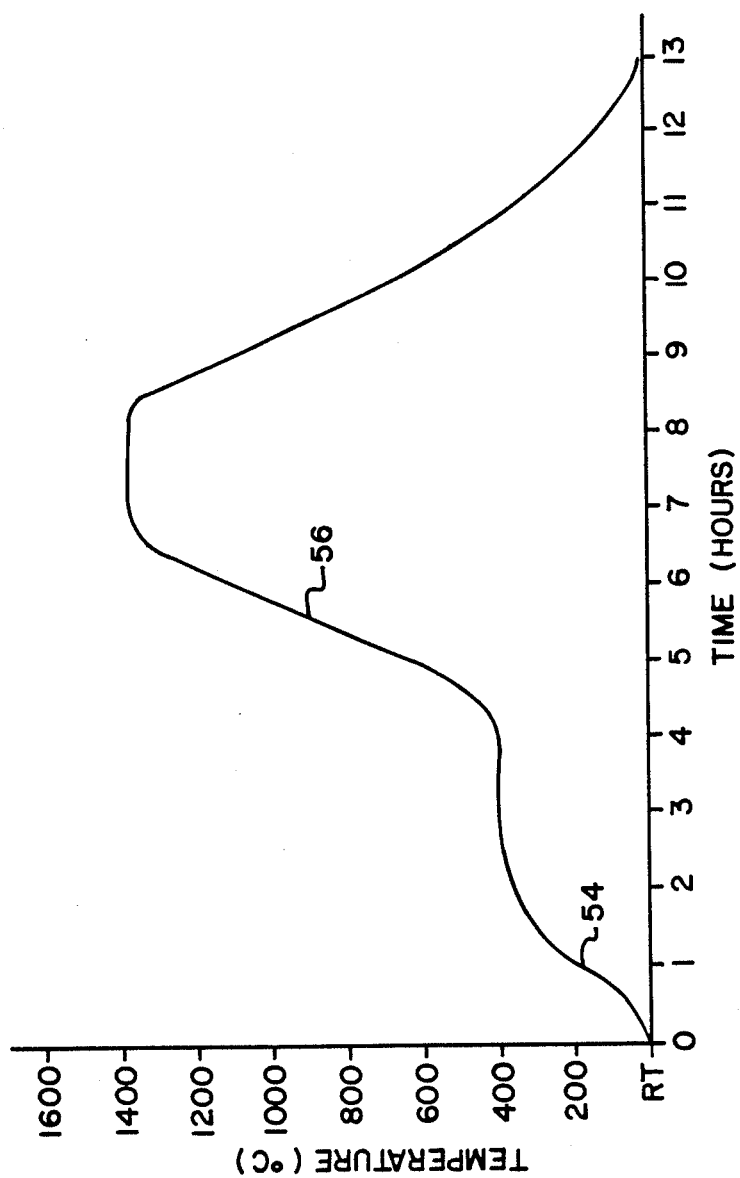
FIG. 3 is a graph illustrating the temperature profile of the present invention.

After the module has reached the temperature for removing the binder, the temperature is then controlled and held at this level for the period of time necessary for complete removal. This time will vary depending upon many factors but typically would be about two hours as illustrated in FIG. 3. After the removal of the binder, the power to the microwave furnace can then be increased at a faster rate, perhaps about 10° per minute as illustrated at 56 in FIG. 3 up to the sintering temperature of 1000° C. to 1600° C. The exact sintering temperature will depend upon the particular materials which are used in the solid oxide fuel cell.

Microwaves pass through materials similarly to light passing through a transparent glass. As the microwaves pass through the material, asymmetrical molecules try to align themselves like magnets in an electromagnetic field. Since the microwave field reverses at least several billion times a second, instant friction is set up within the material resulting in heat throughout the material. Actually, the microwaves will produce a slightly higher temperature within the interior of the material due to the fact that there are radiation heat losses from the surface material. For this reason, it is preferred that a combination of microwave and conventional heating be used at the same time to produce a synergistic effect with greater heating efficiencies and more uniform heating than either of the individual systems could produce alone. In the microwave furnace shown in FIG. 2, the conventional heating is supplied by introducing a heated atmosphere into the microwave furnace through duct 48. This heated atmosphere will be at the appropriate temperature for the particular cycle. For example, during the removal of the binder, when the temperature of the module is perhaps 400° C., the atmopshere which is introduced into the microwave furnace will also be at about 400° C. thus preventing radation losses from the surface of the components of the module. The components will therefore be heated uniformly throughout the thickness of any particular component including the surface.

After the heating cycle, the furnace power is reduced to a level which will reduce the temperature of the module at a rate of about 1°–5° C. per minute down to room temperature. This gradual cooling is important to prevent internal thermal stresses and shock. The microwave heating cycle will again be advantageous in keeping the internal temperature uniform and not relying solely on surface radiation for the cooling process.

The advantage of the microwave heating of the green, unsintered ceramic material of the present invention is that the heating will occur throughout the entire component and, when used in conjunction with conventional heating, will provide for a very uniformed temperature distribution throughout the material. This will minimize a mismatch in shrinkage due to temperature variations and will minimize distortion. This will also reduce to a minimum the inherent disadvantages of using the old conventional heating techniques which resulted in internal cracking, separation of components, blistering and delamination. Because of the overall heating process, both the time and power requirements to effect the removal of the binder and to sinter will be greatly reduced.

I claim:

1. A method of forming a solid oxide fuel cell comprising the steps of:
   (a) forming the unsintered anode, cathode, electrolyte and inner connector layers each containing a binder into the desired fuel cell configuration,
   (b) heating said fuel cell configuration in a furnace with microwaves to a temperature and for a time sufficient to remove said binder, (c) heating said fuel cell configuration in said furnace with microwaves to a higher temperature and for a time sufficient to sinter said layers, and (d) simultaneously with said microwave heating in steps (b) and (c), heating said furnace with conventional heating means to reduce the radiation cooling of the surface of said fuel cell configuration and provide a more uniform temperature throughout said fuel cell configuration.

2. A method of forming a monolithic solid oxide fuel cell module comprising the steps of:

a. forming individual thin layers of cathode material, anode material, electrolyte material and inner connector material, each layer being in the unsintered state and containing a binder, b. laminating said layers of cathode material, anode material and electrotyle material into a triplex layer and forming said triplex layer into a desired shape, c. placing at least one said triplex layer in contact with at least one interconnected layer to form an unsintered module containing binder, d. gradually heating said unsintered module with microwaves while preventing radiation cooling of the surfaces in said unsintered module so as to gradually raise the temperature of said unsintered module to a temperature at which said binder is removed and maintaining said temperature until said binder is substantially removed, e. further gradually heating said unsintered module with microwaves while still preventing radiation cooling of said surfaces in said unsintered module so as to gradually raise the temperature of said unsintered module to a temperature at which said anode material, cathode material, electrolyte material and interconnector material are sintered, and f. gradually cooling said sintered module to room temperature at a rate slow enough to prevent stresses by gradually reducing microwave power.

* * * * *